United States Patent [19]
Ishikawa et al.

[11] Patent Number: 5,945,362
[45] Date of Patent: Aug. 31, 1999

[54] SILICON CARBIDE FIBER HAVING EXCELLENT ALKALI DURABILITY

[75] Inventors: Toshihiro Ishikawa; Yoshikatu Harada; Yoshiyuki Inoue; Hiroyuki Yamaoka, all of Ube, Japan

[73] Assignee: Ube Industries, Ltd., Yamaguchi-ken, Japan

[21] Appl. No.: 08/934,613

[22] Filed: Sep. 22, 1997

[30] Foreign Application Priority Data

| Oct. 2, 1996 | [JP] | Japan | 8-294291 |
| Dec. 26, 1996 | [JP] | Japan | 8-347947 |
| May 16, 1997 | [JP] | Japan | 9-126668 |

[51] Int. Cl.⁶ .................................................. C04B 35/565
[52] U.S. Cl. ............................ 501/95.1; 501/88; 501/89; 501/92
[58] Field of Search ............................ 501/95.1, 88, 89, 501/92

[56] References Cited

U.S. PATENT DOCUMENTS

| 4,762,895 | 8/1988 | Chandra et al. | 525/474 |
| 5,071,600 | 12/1991 | Deleeuw et al. | 501/95.1 |
| 5,162,269 | 11/1992 | Deleeuw et al. | 501/95.1 |
| 5,167,881 | 12/1992 | Atwell et al. | 501/95.1 |
| 5,268,336 | 12/1993 | Deleeuw et al. | 501/95.1 |
| 5,278,110 | 1/1994 | Toreki et al. | 501/95.1 |
| 5,322,822 | 6/1994 | Seguchi et al. | 501/95.1 |
| 5,366,943 | 11/1994 | Lipowitz et al. | 501/95.1 |

FOREIGN PATENT DOCUMENTS

| 0 367 497 | 5/1990 | European Pat. Off. . |
| 0 544 038 | 6/1993 | European Pat. Off. . |

OTHER PUBLICATIONS

Babonneau et al., *Journal of the American Ceramic Society*, vol. 74,. No. 7 (Jul., 1991), pp. 1725–1728.

*Primary Examiner*—Karl Group
*Attorney, Agent, or Firm*—Wenderoth, Lind & Ponack, L.L.P.

[57] ABSTRACT

A crystalline silicon carbide fiber excellent not only in mechanical properties but also in alkali durability at high temperatures, which has a density of at least 2.7 g/cm³, contains 55 to 70% by weight of Si, 30 to 45% by weight of C, 0.06 to 3.8% by weight of Al and 0.06 to 0.5% by weight of B, the total of these elements being 100% by weight, and has a sintered structure of SiC.

4 Claims, No Drawings

SILICON CARBIDE FIBER HAVING EXCELLENT ALKALI DURABILITY

FIELD OF THE INVENTION

The present invention relates to a crystalline silicon carbide fiber having high mechanical properties and excellent alkali durability and further having excellent heat resistance.

PRIOR ART

A silicon-carbide-based fiber is used as a fibrous reinforcement for plastics or ceramics owing to its excellent heat resistance and mechanical properties. As a silicon carbide fiber, there is widely known an amorphous or microcrystalline fiber (to be referred to as "amorphous silicon carbide fiber" hereinafter) obtained by heat treatment at a relatively low temperature, e.g., a temperature of 1,300° C. or lower, and the amorphous silicon carbide fiber is practically used as a fibrous reinforcement for a variety of matrices.

Concerning the above amorphous silicon carbide fiber and its production process, many proposals have been already made. For example, JP-B-58-38535 discloses a process for producing a silicon carbide fiber, which comprises spinning an organosilicon polymer having a chain formed of silicon and carbon as main structural components, heating a spun fiber at a low temperature in an oxidizing atmosphere to form an infusible fiber and calcining the formed infusible fiber at a high temperature. Further, JP-B-62-52051 discloses a silicon-carbide-based inorganic fiber composed of silicon-carbon-titanium-oxygen, and JP-B-58-5286 discloses a process for producing the above silicon-carbide-based inorganic fiber composed of silicon-carbon-titanium-oxygen, which comprises spinning a polytitanocarbosilane obtained by bonding part of silicon atoms of a polycarbosilane to titanium atoms through oxygen atom, infusibilizing a spun fiber and calcining an infusibilized fiber.

There are being developed crystalline silicon carbide fibers of which silicon carbide particles are sintered by heat-treating the above amorphous silicon carbide fiber under the action of a sintering aid at a higher temperature, e.g., at least 1,500° C. Several proposals have been found with regard to these crystalline silicon carbide fibers. For example, U.S. Pat. No. 5,268,336 discloses a crystalline silicon carbide fiber containing at least 0.2% by weight of boron and having a density of at least 2.9 g/cm$^3$. Further, U.S. Pat. No. 5,366,943 discloses a crystalline silicon carbide fiber composed of silicon, carbon, titanium and/or zirconium and a sintering aid such as boron.

It has been pointed out that amorphous silicon carbide fibers are excellent in heat resistance and mechanical properties but that they have no sufficient alkali durability and show a decrease in mechanical properties since the elimination of oxygen in the fibers in the form of Co gas and/or SiO and the sharp growth of a β-SiC crystal take place at a high temperature exceeding 1,300° C.

Journal of American Ceramic Society, 78 [7], 1992–96 (1995), describes a method of testing silicon-carbide-based fibers for alkali durability. In this test method, a silicon-carbide-based fiber is immersed in a sodium chloride aqueous solution which is saturated at room temperature, then dried, heat-treated in air at 1,000° C. for 2 hours and then measured for mechanical properties (this method will be referred to as "alkali durability test" hereinafter). The alkali durability test is an acceleration test for testing the durability of a silicon carbide fiber against NaCl. The above Journal describes the following. When a silicon carbide fiber is subjected to the alkali durability test, the fiber is extremely decomposed by oxidation, a crystal phase of tridymite is formed on the fiber surface, and the growth of crystal grains of β-SiC is observed in the vicinity thereof, all of which cause serious adverse effects on the mechanical properties of the fiber.

Further, the crystalline silicon carbide fibers disclosed in U.S. Pat. No. 5,268,336 and U.S. Pat. No. 5,366,943, which fibers are obtained by sintering silicon carbide particles, exhibit excellent mechanical properties at a temperature over 1,300° C., while, like an amorphous silicon carbide fiber, these fibers have a problem to solve, i.e., poor alkali durability.

SUMMARY OF THE INVENTION

It is an object of the present invention to provide a crystalline silicon carbide fiber which is excellent not only in mechanical properties but also in alkali durability at high temperatures, and a process for the production thereof.

According to the present invention, there is provided a crystalline silicon carbide fiber having excellent alkali durability, which has a density of at least 2.7 g/cm$^3$, a strength of at least 2 GPa and an elastic modulus of at least 250 GPa and which has a sintered structure of SiC.

According to the present invention, further, there is provided a crystalline silicon carbide fiber having excellent alkali durability, which has a density of at least 2.7 g/cm$^3$, which contains 55 to 70% by weight of Si, 30 to 45% by weight of C, 0.06 to 3.8% by weight of Al and 0.06 to 0.5% by weight of B, the total of these elements being 100% by weight, and which has a sintered structure of SiC.

According to the present invention, further, there is provided a crystalline silicon carbide fiber having excellent alkali durability, which has a density of at least 2.7 g/cm$^3$, which contains 55 to 70% by weight of Si, 30 to 45% by weight of C, 0.06 to 3.8% by weight of Al, 0 to 0.2% by weight of B and one or both of 0.06 to 3.8% by weight of Y and 0.06 to 3.8% by weight of Mg, the total of these elements being 100% by weight, and which has a sintered structure of SiC.

According to the present invention, further, there is provided a process for the production of a crystalline silicon carbide fiber having excellent alkali durability, which comprises heat-treating an amorphous silicon carbide fiber containing 0.05 to 3% by weight of Al, 0.05 to 0.4% by weight of B and at least 1% by weight of excess carbon in an inert gas at a temperature in the range of from 1,600° C. to 2,100° C.

According to the present invention, further, there is provided a process for the production of a crystalline silicon carbide fiber having excellent alkali durability, which comprises heat-treating an amorphous silicon carbide fiber containing 0.05 to 3% by weight of Al, 0 to 0.1% by weight of B, one or both of 0.05 to 3% by weight of Y and 0.05 to 3% by weight of Mg, and at least 1% by weight of excess carbon in an inert gas at a temperature in the range of from 1,600° C. to 2,100° C.

DETAILED DESCRIPTION OF THE INVENTION

The present inventors have found the following. In a silicon carbide fiber obtained from an organosilicon polymer containing predetermined amount ratios of aluminum and boron or containing predetermined amount ratios of aluminum, boron and yttrium and/or magnesium, an SiC crystal in the fiber is effectively sintered at a temperature of 1,500° C. or higher, and due to the presence of both aluminum and boron even if the concentrations of the aluminum and boron are low, there can be obtained a crystalline silicon carbide fiber having high strength and a high elastic modulus as compared with a fiber containing either the above aluminum or boron. It has been further found that the above crystalline silicon carbide fiber exhibits excellent alkali resistance due to the presence of the aluminum.

The crystalline silicon carbide fiber of the present invention will be explained first hereinafter.

The crystalline silicon carbide fiber of the present invention has a sintered structure of SiC and a density of at least 2.7 g/cm$^3$, and has excellent mechanical properties, i.e., a strength of at least 2 GPa and an elastic modulus of at least 250 GPa. It is a more important feature of the crystalline silicon carbide fiber of the present invention that the strength retaining ratio thereof after the alkali durability test is at least 50%. To the present inventors' knowledge, the present invention is the first to provide a crystalline silicon carbide fiber which exhibits the above excellent strength retaining ratio after the alkali durability test.

The crystalline silicon carbide fiber of the present invention is composed of silicon and carbon as main components, and is further composed of aluminum and boron, or of aluminum, boron and yttrium and/or magnesium, as sintering aid components. When the crystalline silicon carbide fiber contains aluminum and boron as sintering aid components, the contents of the above components are as follows. The content of Si is 55 to 70% by weight, the content of C is 30 to 45% by weight, the content of Al is 0.06 to 3.8% by weight, preferably 0.13 to 1.25% by weight, and the content of B is 0.06 to 0.5% by weight, preferably 0.06 to 0.19% by weight.

When the crystalline silicon carbide fiber further contains yttrium and/or magnesium as sintering aid, the content of Si is 55 to 70% by weight, the content of C is 30 to 45% by weight, the content of Al is 0.06 to 3.8% by weight, preferably 0.13 to 1.25% by weight, the content of B is 0 to 0.2% by weight, and the content of Y is 0.06 to 3.8% by weight, preferably 0.13 to 1.25% by weight, and/or the content of Mg is 0.06 to 3.8% by weight, preferably 0.13 to 1.25% by weight.

When the content of aluminum is too small, the crystalline silicon carbide fiber shows decreased alkali durability. When it is too large, the crystalline silicon carbide fiber shows decreased mechanical properties at high temperatures. When the content of boron is too small, it is difficult to produce a fully sintered crystalline fiber, and the formed fiber has a low density. When it is too large, the crystalline silicon carbide fiber shows decreased alkali durability.

When the crystalline silicon carbide fiber contains yttrium and/or magnesium in addition, the content of boron may be decreased since sufficient sinterability and excellent alkali resistance can be exhibited.

The above crystalline silicon carbide fiber sometimes contains a small amount of oxygen and excess carbon, while the content of each of these components is preferably 2% by weight or less. The term "excess carbon" in the present specification refers to carbon present when the amount of carbon exceeds the stoichiometric amount of carbon which is in the form of SiC together with Si contained in the fiber. Although not specially limited, the diameter of the crystalline silicon carbide fiber is generally 50 $\mu$m or less. Further, the crystalline silicon carbide fiber preferably has a continuous form.

The process for the production of the crystalline silicon carbide fiber of the present invention will be explained below.

The crystalline silicon carbide fiber is produced by heating an amorphous silicon carbide fiber containing 0.05 to 3% by weight, preferably 0.1 to 1% by weight, of Al, 0.05 to 0.4% by weight, preferably 0.05 to 0.15% by weight, of B and at least 1% by weight, preferably 1.5 to 2.5% by weight, of excess carbon at a temperature in the range of from 1,600 to 2,100° C.

Further, the crystalline silicon carbide fiber is also produced by heating an amorphous silicon carbide fiber containing 0.05 to 3% by weight, preferably 0.1 to 1% by weight, of Al, 0 to 0.1% by weight of B, one or both of 0.05 to 3% by weight, preferably 0.1 to 1% by weight, of Y and 0.05 to 3% by weight, preferably 0.1 to 1% by weight, of Mg and at least 1% by weight of excess carbon at a temperature in the range of from 1,600 to 2,100° C. The above heat treatment is carried out in an atmosphere containing an inert gas such as argon or helium.

When the content of aluminum in the amorphous silicon carbide fiber exceeds 3% by weight, a large amount of aluminum is omnipresent in grain boundaries of a sintered SiC crystal in the sintered fiber, and the grain boundaries are dominantly destroyed. As a result, no high strength can be obtained, and the crystalline silicon carbide fiber shows extremely decreased mechanical properties at high temperatures. When the content of aluminum in the amorphous silicon carbide fiber is less than 0.05% by weight, there can be no longer obtained a sufficiently sintered crystalline fiber. When the content of boron in the amorphous silicon carbide fiber exceeds 0.4% by weight, the crystalline silicon carbide fiber shows extremely decreased alkali resistance. When the above content of boron is less than 0.05% by weight, there can be no longer obtained a sufficiently sintered crystalline fiber.

When yttrium and/or magnesium are/is co-present, the content of boron may be decreased since sufficient sinterability and excellent alkali resistance can be exhibited.

Further, the amorphous silicon carbide fiber preferably contains 8 to 16% by weight of oxygen. When the amorphous silicon carbide fiber is heated, the oxygen works to eliminate the above excess carbon in the form of CO gas.

The above amorphous silicon carbide fiber can be prepared, for example, by the following method.

According to the method described, for example, in "Chemistry of Organosilicon Compounds", Kagaku Dojin (1972), at least one kind of dichlorosilane is subjected to dechlorination in the presence of sodium, to prepare linear or cyclic polysilane. The polysilane generally has a number average molecular weight of 300 to 1,000. The term "polysilane" in the present specification includes a polysilane partly containing a carbosilane bond, obtained by heating the above linear or cyclic polysilane to a temperature in the range of from 400 to 700° C. or by adding a phenyl-group-containing polyborosiloxane to the above linear or cyclic polysilane and heating the mixture to a temperature in the range of from 250 to 500° C. The polysilane may have a hydrogen atom, a lower alkyl group, an aryl group, a phenyl group or a silyl group as a side chain to silicon.

The phenyl-group-containing polyborosiloxane can be prepared by the hydrochloric-acid-removal and condensation reaction of boron and at least one diorganochlorosilane according to the method described in JP-B-53-42330 and JP-B-53-50299. The phenyl-group-containing polyborosiloxane generally has a number average molecular weight of 500 to 10,000.

Then, a predetermined amount of an alkoxide, acetylacetoxide compound, carbonyl compound or cyclopentadienyl compound of aluminum is added to the polysilane, and the mixture is allowed to react in an inert gas at a temperature, generally, in the range of from 250 to 350° C. for 1 to 10 hours, whereby an aluminum-containing organosilicon polymer as a spinning raw material can be obtained. The amount of the above compound of aluminum is generally 0.14 to 0.86 mmol per gram of the polysilane.

The aluminum-containing organosilicon polymer is spun according to a known method such as a melt spinning method or a dry spinning method, to prepare a spun fiber. Then, the spun fiber is infusibilization-treated to prepare an infusible fiber. The infusibilization is preferably carried out by a generally employed method of heating a fiber in air or a generally employed method using a combination of the heating in air and heating in an inert gas.

The infusible fiber is heat-treated in an inert gas such as nitrogen, argon, or the like at a temperature in the range of 800 to 1,500° C., to prepare the amorphous silicon carbide fiber which is a precursor fiber for the crystalline silicon carbide fiber of the present invention. At a final stage, the amorphous silicon carbide fiber is heated to a temperature in the range of from 1,600 to 2,100° C. as already described, whereby the crystalline silicon carbide fiber of the present invention can be obtained. The preparation of the amorphous silicon carbide fiber from the infusible fiber and the production of the crystalline silicon carbide fiber from the amorphous silicon carbide fiber can be carried out independently of each other or continuously as a series of procedures.

EXAMPLES

The present invention will be explained with reference to Examples hereinafter. In Examples, "part" and "%" stand for "part by weight" and "% by weight" unless otherwise specified.

Referential Example 1

1,034 Parts of dimethyldichlorosilane was dropwise added to anhydrous xylene containing 400 parts of sodium while the xylene was refluxed under heat under the current of nitrogen gas, and thereafter, the mixture was refluxed under heat for 10 hours to form a precipitate. The precipitate was recovered by filtration and washed with methanol and then with water to give 420 parts of a white plydimethylsilane.

Referential Example 2

750 Parts of diphenyldichlorosilane and 124 parts of boron were heated in n-butyl ether in a nitrogen gas atmosphere at 100 to 120° C., and the resultant white resinous substance was further heated in vacuum at 400° C. for 1 hour, to give 530 parts of a phenyl-group-containing polyborosiloxane.

Example 1

4 Parts of the phenyl-group-containing polyborosiloxane obtained in Referential Example 2 was added to 100 parts of the polydimethylsilane obtained in Referential Example 1, and these components were heat-condensed in a nitrogen gas atmosphere at 350° C. for 5 hours, to give an organosilicon polymer having a high molecular weight. 100 Parts of the organosilicon polymer was dissolved in xylene, 7 parts of aluminum-tri(sec-butoxide) was added to the resultant xylene solution, and these components were subjected to a crosslinking reaction under a nitrogen gas current at 310° C., to give a polyaluminocarbosilane.

The above polyaluminocarbosilane was melt-spun at 245° C., and a spun fiber was heat-treated in air at 140° C. for 5 hours and further heated in nitrogen at 300° C. for 10 hours to give an infusible fiber. The infusible fiber was continuously calcined in nitrogen at 1,500° C. to give an amorphous silicon carbide fiber. The chemical composition of the amorphous silicon carbide fiber was as follows. Si: 56%, C: 30%, O: 13%, Al: 0.6%, and B: 0.05%.

Then, the above amorphous silicon carbide fiber was continuously heat-treated in argon at 1,900° C., to give a crystalline silicon carbide fiber. The chemical composition of the crystalline silicon carbide fiber was as follows. Si: 67%, C: 31%, O: 3%, Al: 0.8%, and B: 0.06%. The Si:C:O:Al atomic ratio thereof was 1:1.08:0.008:0.012. The crystalline silicon carbide fiber had a density of 2.9 g/cm$^3$ and had a dense sintered structure of SiC.

The above fiber showed the following mechanical properties before and after the alkali durability test.

|  | Before the test | After the test |
| --- | --- | --- |
| Tensile strength (GPa) | 2.6 | 2.1 (Strength retaining ratio: 80.7%) |
| Elastic modulus (GPa) | 314 | 301 |

It was observed that the fiber surface after the alkali durability test retained a remarkably fine state. Further, after the above crystalline silicon carbide fiber was heat-treated in argon at 1,600° C. for 1 hour, the heat-treated crystalline silicon carbide fiber retained 94% of the strength found before the heat treatment.

Comparative Example 1

20 Parts of the phenyl-group-containing polyborosiloxane obtained in Referential Example 2 was added to 100 parts of the polydimethylsilane obtained in Referential Example 1, and these components were heat-condensed in a nitrogen gas atmosphere at 350° C. for 10 hours. The resultant polymer was melt-spun at 240° C. and heat-treated in air at 160° C. for 9 hours to obtain an infusible fiber. The infusible fiber was continuously calcined in nitrogen at 1,500° C. to give an amorphous silicon carbide fiber. The thus-obtained fiber was continuously heat-treated in argon at 1,900° C. to give a crystalline silicon carbide fiber.

The chemical composition of the crystalline silicon carbide fiber was as follows. Si: 62%, C: 37%, O: 0.5%, and B: 0.3%. The atomic ratio of Si:C:O thereof was 1:1.4:0.014. The crystalline silicon carbide fiber showed a tensile strength of 1.3 GPa and an elastic modulus of 205 GPa. That is, the these values were lower than those of the fiber obtained in Example 1 in which aluminum was co-present. When the crystalline silicon carbide fiber was subjected to the alkali durability test, fiber filaments thereof were mutually fused, and the fiber was not measurable for strengths after the test.

Comparative Example 2

100 Parts of the polydimethylsilane obtained in Referential Example 1 was heat-condensed in nitrogen gas at 470° C. for 4 hours to obtain a polycarbosilane having a high molecular weight. 100 Parts of the polycarbosilane was dissolved in xylene, and 10 parts of aluminum-tri(sec-butoxide) was added to the xylene solution. These components were subjected to a crosslinking raction under nitrogen gas current at 320° C., to obtain a polyaluminocarbosilane. The polyaluminocarbosilane was melt-spun at 255° C., and a spun fiber was heat-treated in air at 150° C. for 6 hours and then further heated in nitrogen at 300° C. for 10 hours to give an infusible fiber.

The infusible fiber was continuously calcined in nitrogen at 1,400° C. to obtain an amorphous silicon carbide fiber. The amorphous silicon carbide fiber was continuously heat-treated in argon at 1,800° C., to give a crystalline silicon carbide fiber. The chemical composition of the crystalline silicon carbide fiber was as follows. Si: 66%, C: 32%, O: 3%, and Al: 1.1%. The atomic ratio of Si:C:O: thereof was 1:1.13:0.013:0.017. The crystalline silicon carbide fiber showed a tensile strength of 1.8 GPa and an elastic modulus of 294 GPa, which value were lower than those of the fiber obtained in Example 1 in which boron was co-present, while the fiber had a crystal structure of SiC. The above crystalline silicon carbide fiber was subjected to the alkali durability test and then measured for a tensile strength and an elastic modulus to show 1.3 GPa and 245 GPa. The crystalline silicon carbide fiber had a tensile strength retaining ratio of 72%.

Example 2

0.5 Part of the phenyl-group-containing polyborosiloxane obtained in Referential Example 2 was added to 100 parts of the polydimethylsilane obtained in Referential Example 1, and these components were heat-condensed in a nitrogen gas atmosphere at 410° C. for 5 hours to obtain an organosilicon polymer having a high molecular weight. 100 Parts of the organosilicon polymer was dissolved in xylene, and 4 parts of aluminum-tri(sec-butoxide) and 3 parts of magnesium acetylacetonate were added to the xylene solution. These components were subjected to a crosslinking reaction in a nitrogen gas current at 310° C., to give a modified polycarbosilane into which aluminum and magnesium were introduced.

The above modified polycarbosilane was melt-spun at 255° C., and a spun fiber was heat-treated in air at 150° C. for 3 hours and further heated in nitrogen at 300° C. for 9 hours, to give an infusible fiber. The infusible fiber was continuously calcined in argon at 1,450° C. to give an amorphous silicon carbide fiber. The chemical composition of the amorphous silicon carbide fiber was as follows. Si: 53%, C: 33.4%, O: 13%, Al: 0.34%, B: 0.01%, Mg: 0.30%.

Then, the above amorphous silicon carbide fiber was continuously heat-treated in argon at 1,850° C. to give a crystalline silicon carbide fiber. The chemical composition of the crystalline silicon carbide fiber was as follows. Si: 66.5%, C: 32.5%, O: 2%, Al: 0.43%, B: 0.01%, and Mg: 0.38%. The Si:C:O:Al: Mg atomic ratio thereof was 1:1.14:0.005:0.0067:0.0066. The crystalline silicon carbide fiber had a density of 2.87 g/cm$^3$ and had a dense sintered structure of SiC.

The above fiber showed the following mechanical properties before and after the alkali durability test.

|  | Before the test | After the test |
| --- | --- | --- |
| Tensile strength (GPa) | 2.4 | 2.1 (Strength retaining ratio: 87.5%) |
| Elastic modulus (GPa) | 305 | 298 |

It was observed that the fiber surface after the alkali durability test retained a remarkably fine state. Further, after the above crystalline silicon carbide fiber was heat-treated in argon at 1,600° C. for 1 hour, the heat-treated crystalline silicon carbide fiber retained 91% of the strength found before the heat treatment.

Example 3

0.2 Parts of the phenyl-group-containing polyborosiloxane obtained in Referential Example 2 was added to 100 parts of the polydimethylsilane obtained in Referential Example 1, and these components were heat-condensed in a nitrogen gas atmosphere at 420° C. for 5 hours, to obtain an organosilicon polymer having a high molecular weight. 100 Parts of the organosilicon polymer was dissolved in xylene, and 4 parts of aluminum-tri(sec-butoxide) and 4 parts of yttrium acetylacetonate were added to the xylene solution. These components were subjected to a crosslinking reaction in a nitrogen gas current at 300° C., to give a modified polycarbosilane into which aluminum and yttrium were introduced.

The above modified polycarbosilane was melt-spun at 265° C., and a spun fiber was heat-treated in air at 155° C.

for 3 hours and further heated in nitrogen at 300° C. for 10 hours, to give an infusible fiber. The infusible fiber was continuously calcined in argon at 1,450° C. to give an amorphous silicon carbide fiber. The chemical composition of the amorphous silicon carbide fiber was as follows. Si: 52.5%, C: 34.5%, O: 12%, Al: 0.35%, B: 0.005%, Y: 0.56%.

Then, the above amorphous silicon carbide fiber was continuously heat-treated in argon at 1,900° C. to give a crystalline silicon carbide fiber. The chemical composition of the crystalline silicon carbide fiber was as follows. Si: 67%, C: 31.5%, O: 1%, Al: 0.41%, B: 0.01%, and Y: 0.73%. The Si:C:O:Al:Y atomic ratio thereof was 1:1.1:0.0026:0.0064:0.0034. The crystalline silicon carbide fiber had a density of 3.01 g/cm$^3$ and had a dense sintered structure of SiC.

The above fiber showed the following mechanical properties before and after the alkali durability test.

|  | Before the test | After the test |
| --- | --- | --- |
| Tensile strength (GPa) | 2.5 | 2.2 (Strength retaining ratio: 88%) |
| Elastic modulus (GPa) | 325 | 315 |

It was observed that the fiber surface after the alkali durability test retained a remarkably fine state. Further, after the above crystalline silicon carbide fiber was heat-treated in argon at 1,600° C. for 1 hour, the heat-treated crystalline silicon carbide fiber retained the strength found before the heat treatment.

What is claimed is:

1. A crystalline silicon carbide fiber having excellent alkali durability, which has a density of at least 2.7 g/cm$^3$, which contains 55 to 70% by weight of Si, 30 to 45% by weight of C, 0.06 to 3.8% by weight of Al and 0.06 to 0.19% by weight of B, the total of these elements being 100% by weight, and which has a sintered structure of SiC.

2. A crystalline silicon carbide fiber according to claim 1, wherein the crystalline silicon carbide fiber has a strength retaining ratio of at least 50% after the crystalline silicon carbide fiber is immersed in a saturated aqueous solution of sodium chloride at room temperature and then heat-treated in air at 1,000° C. for 2 hours.

3. A crystalline silicon carbide fiber having excellent alkali durability, which has a density of at least 2.7 g/cm$^3$, which contains 55 to 70% by weight of Si, 30 to 45% by weight of C, 0.06 to 3.8% by weight of Al, 0 to 0.2% by weight of B and one or both of 0.06 to 3.8% by weight of Y and 0.06 to 3.8% by weight of Mg, the total of these elements being 100% by weight, and which has a sintered structure of SiC.

4. A crystalline silicon carbide fiber according to claim 3, wherein the crystalline silicon carbide fiber has a strength retaining ratio of at least 50% after the crystalline silicon carbide fiber is immersed in a saturated aqueous solution of sodium chloride at room temperature and then heat-treated in air at 1,000° C. for 2 hours.

* * * * *